Jan. 21, 1958  R. W. FENEMORE ET AL  2,820,295
APPARATUS FOR MEASURING LINEAR DIMENSIONS
Filed July 13, 1954

INVENTORS
RONALD WILLIAM FENEMORE
COLIN RODERICK BORLEY
MORGAN JELLIS
BY
AGENT

United States Patent Office 2,820,295
Patented Jan. 21, 1958

---

2,820,295

APPARATUS FOR MEASURING LINEAR DIMENSIONS

Ronald William Fenemore, Coulsdon, Colin Roderick Borley, Hildenborough, and Morgan Jellis, Coventry, England, assignors to The Mullard Radio Valve Company Limited, London, England Application July 13, 1954, Serial No. 442,992

Claims priority, application Great Britain July 13, 1953

6 Claims. (Cl. 33—107)

This invention relates to means for measuring or indicating linear dimensions or relative positions and the invention relates more particularly to scales or scale members having scale divisions and methods of manufacturing such scales or scale members.

It is an object of the present invention to provide an improved scale member in which the scale divisions are robust structural elements at least partially protected against damage by the nature of the construction.

A scale member according to the invention essentially comprises a regularly screw-threaded element wherein one of the two sides of the helical threading is formed as an accurate reference surface and wherein the profile of the threading is exposed along a longitudinal measuring face intersecting the screw threads and generated by motion of a straight or substantially straight line maintained parallel to the axis of the screw threads, the intersections between said reference surface of the threading and said measuring face providing the scale divisions.

Preferably, the longitudinal measuring face forms an angle of more than 90° with the tangent thereat of any helix on the reference surface of each thread, such angle being the angle which does not include the material of the thread constituting the scale division. This permits optical determination readily to be effected, e. g. by a light beam transverse to the scale, without interference from the retained screw-thread portions since the latter are inclined away from the gaps between successive threads at the longitudinal measuring face.

The longitudinal measuring face may for example be a face or side of a bar the remainder of which is screw-threaded or it may be a side of a bar of generally rectangular or triangular cross-section having the screw threads cut at its corners or, in the case of a rectangular cross-section, on two opposite sides. Advantageously, however, the screw threads are cut on a cylindrical bar or tube and the longitudinal measuring face lies in a plane passing through the axis of the threading and is provided as one side of a longitudinal notch.

Preferably, the reference side of the threading is a surface generated by motion of a straight line passing through the axis of the threading and maintained normal to said axis, and preferably also the side of the exposed profile of each thread other than the reference side is inclined to the latter.

The pitch of the threading need only be highly accurate at the scale divisions and the latter may be corrected by final grinding or polishing so as to compensate for any slight inaccuracy in the screw-threading as a whole. For example, the longitudinal measuring face may be machined initially as an accurately planar surface, and small inaccuracies in the spacing of the scale divisions may then be corrected by machining or polishing the face to appropriate depths in the region of selected scale divisions, it being understood that the scanning or sensing means to be employed with such a scale member will have to be such as to allow for the consequent slight variations in the plane of the measuring face; the generatrix of said face is thus no longer accurately straight although remaining substantially straight.

If desired, two or more longitudinal notches may be cut in the scale member so as to provide alternative sets of scale divisions available e. g. in the event of damage to any one set.

A scale member according to the invention may be employed in conjunction with appropriate optical, mechanical, magnetic or other scanning or sensing means.

Moreover, a scale member according to the present invention may be applied to various devices wherein accurate positioning of a slidable member is desired. For example in a jig boring machine which is employed for extremely accurate machining operations, rectilinear movement of the table must be made with great precision and a scale member according to the invention may be associated with the table to permit measurement of such movements.

A preferred embodiment of the invention will now be described by way of example with reference to the drawing accompanying the specification in which.

Figure 1:
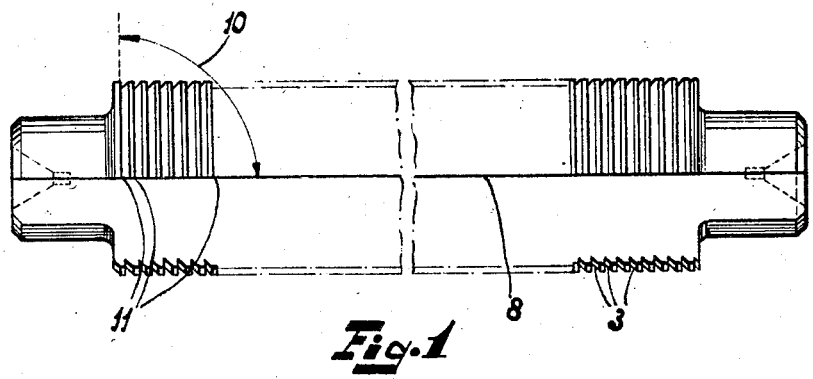
Figure 1 is a side view of the scale member.
Figure 2:
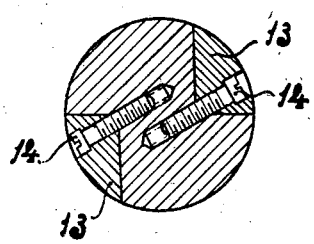
Figure 2 is a cross-section of the member prior to threading, with filling or packing pieces in position.
Figure 3:
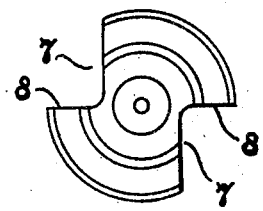
Figure 3 is an end view of the member after screw threading and removal of the fillers and Figure 4 shows the profile of the screw threads to a larger scale.
Figure 4:
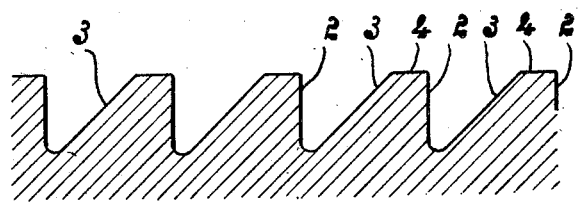

Referring now to the drawing, the scale member is formed as a cylindrical bar which is threaded with screw threads having a profile or cross-section substantially in the form of a trapezium. The pitch of the threading can be selected for any suitable increment and conveniently a 0.1" pitch may be employed. The profile of the threading has a reference side surface 2 normal to the axis of the member, a side surface 3 inclined at about 45° and a cylindrical outer surface 4.

The threaded bar has two longitudinal notches 7 cut off it parallel to the axis so as to leave accurate longitudinal measuring faces 8 lying in a plane which passes through the axis of the member, such faces intersecting the threading in such a way as to form with the reference surfaces thereof a helix angle 10 (Figure 1) of more than 90°, such angle being the angle which does not include the material of the thread constituting the scale division. As aforementioned, this permits optical determination readily to be effected without interference from the retained screw-thread portions since the latter are included away from the gaps between successive threads at the longitudinal measuring face. This leaves sharp parallel scale division edges or corners 11 which can be viewed optically while their position can be determined with great accuracy e. g. when explored by a light beam transverse to the axis of the scale member and moving in a plane which is parallel to said axis and intersects surfaces 2 and 3. As will be appreciated, the edges 11 are partially protected against damage by their location within the helical grooves.

The scale member is preferably made of hardened steel although it may be made of other materials with other expansion coefficients. It is thread-ground on any suitable thread grinding machine which incorporates a pitch correcting device for ensuring that the thread is securely ground. It is also possible to manufacture the scale member on an accurate screw cutting lathe. The reference surface of the threading may be coated with tungsten carbide or other corrosion resistant material in order to provide an enduring surface.

Preferably the scale member is manufactured by cutting the longitudinal notches 7 and faces 8 before the threads, fillers 13 being then fitted therein and secured by screws 14. The screw threads are then machined or ground in the material of the bar and that of the fillers, and the latter are subsequently removed.

What is claimed is:

1. A method of manufacturing a scale member which includes the steps of machining a longitudinal notch in a cylindrical bar, which notch is parallel to the axis of said bar, securing a filler in said notch, machining regular helical screw threads with an accurate reference side in the material of the bar and that of the filler, and removing the filler to expose the profile of the screw threads as scale divisions.

2. An apparatus for measuring linear dimensions comprising an element provided with a longitudinal groove and having screw threads, each of said screw threads being provided with side surfaces and an outer cylindrical surface, one of said side surfaces being formed as an accurate reference surface, a longitudinal measuring face on one side of said groove intersecting said screw threads and generated by motion of a substantially straight line parallel to the axis of said screw threads, the intersections of the reference surfaces of said screw threads and said longitudinal measuring face providing the scale divisions for said apparatus.

3. An apparatus as set forth in claim 2 wherein the longitudinal measuring face forms an angle of more than 90° with a helix on the reference surface of each screw thread.

4. An apparatus as set forth in claim 2 wherein said longitudinal measuring face lies in a plane parallel to the axis of said screw threads and constituting one side of said longitudinal groove.

5. An apparatus as set forth in claim 2 wherein each of said reference surfaces is a surface generated by motion of a straight line passing substantially transversely through the axis of said screw threads.

6. An apparatus as set forth in claim 2 wherein the other of said side surfaces is inclined in the direction of said reference surface.

References Cited in the file of this patent

UNITED STATES PATENTS

| | | |
|---|---|---|
| 228,882 | Fleming | June 15, 1880 |
| 313,552 | Sweet | Mar. 10, 1885 |
| 737,833 | Gardner | Sept. 1, 1903 |
| 1,327,101 | Kellogg | Jan. 6, 1920 |
| 2,111,977 | Lindner | Mar. 22, 1938 |
| 2,663,344 | Burdick | Dec. 22, 1953 |

OTHER REFERENCES

Page 1007 of Machinery's Handbook, 14th edition, 1949, published by The Industrial Press, 148 Lafayette Street, New York 13, N. Y.